(12) United States Patent
Rutz et al.

(10) Patent No.: US 6,196,267 B1
(45) Date of Patent: Mar. 6, 2001

(54) COCK-TYPE MELT FLOW CONTROL VALVE

(75) Inventors: Andreas Rutz, Lindau; Friedrich Mueller, Remscheid, both of (DE); Udo Bock, Duebendorf (CH)

(73) Assignee: Lindauer Dornier Gesellschaft mbH, Lindau (DE)

( * ) Notice: Subject to any disclaimer, the term of this patent is extended or adjusted under 35 U.S.C. 154(b) by 0 days.

(21) Appl. No.: 09/324,242

(22) Filed: Jun. 2, 1999

(30) Foreign Application Priority Data

Jun. 4, 1998 (DE) .............................................. 198 24 902

(51) Int. Cl.⁷ ...................................................... F16K 11/08
(52) U.S. Cl. .............. 137/625.47; 137/312; 137/625.16; 210/340
(58) Field of Search ......................... 137/625.16, 625.47; 210/333.1, 340

(56) References Cited

U.S. PATENT DOCUMENTS

| | | | |
|---|---|---|---|
| 2,702,050 | * | 2/1955 | Thomas ............................ 137/625.17 |
| 3,679,060 | * | 7/1972 | Smith ................................ 210/333.1 |
| 3,935,108 | * | 1/1976 | Forgues ............................... 210/340 |
| 4,430,220 | * | 2/1984 | Litzenburger ...................... 210/333.1 |
| 4,817,662 | * | 4/1989 | Skibowski ............................ 137/312 |
| 5,462,653 | | 10/1995 | Hills . |
| 5,536,399 | | 7/1996 | Kaneshige . |

FOREIGN PATENT DOCUMENTS

| 4407941 | 9/1994 | (DE) . |
|---|---|---|
| 1455611 | 11/1976 | (GB) . |

* cited by examiner

*Primary Examiner*—John Fox
(74) *Attorney, Agent, or Firm*—W. F. Fasse; W. G. Fasse (57) ABSTRACT

A flow control valve such as a melt flow control valve includes a cock plug body (2) rotatably arranged in a housing (3) having a single melt inlet port (1) extending axially relative to the rotatable cock plug body (2), and at least two melt outlet ports (4, 5) extending radially relative to the cock plug body (2). The cock plug body has a flow passage including an axially extending inflow portion (15) and at least one radially extending outflow portion (16) to selectively communicate the inlet port (1) with a selected one of the outlet ports (4, 5). The cock plug body (2) further has at least one pre-flooding passage (20) extending from the main flow channel to an opening radially displaced from the outflow portion (16), so that a pre-flooding partial flow of melt can flow from the flow channel into the next outlet port, when the cock plug body begins to be rotationally switched from one to the next outlet port.

24 Claims, 8 Drawing Sheets

COCK-TYPE MELT FLOW CONTROL VALVE

This application is based on and claims the priority under 35 U.S.C. §119 of German Patent Application 198 24 902.0 filed on Jun. 4, 1998, the entire disclosure of which is incorporated herein by reference.

FIELD OF THE INVENTION

The invention relates to a valve having a rotatable cock plug body for selectively controlling the flow of a fluid from an inlet port to a selected one of at least two outlet ports. Such a valve is particularly suitable to be used for controlling the flow of molten thermoplastic polymer material to either selected one of two melt filters of an apparatus or plant for producing thermoplastic sheet goods.

BACKGROUND INFORMATION

Melt flow control valves of the above mentioned general type are typically used in extrusion plants especially for controlling the flow of the polymer melt to large-surface-area melt filters.

Such valves are conventionally embodied as three-path valves and serve to control the flow of the melt into and out of the respective filter chamber or chambers. In double melt filter arrangements, one filter chamber is respectively operational at any given time, i.e. being used for filtering the melt during the extrusion production process, while the other filter chamber is being cleaned and equipped with a new filter cartridge. The used filter cartridge is cleaned in a space or chamber that is especially provided therefore and is then prepared for reuse.

Control of the melt flow respectively to the two filter chambers is typically provided by two conventional three-path valves, which are available and are utilized in different embodiments having single cylindrical or conical cock plug bodies, double cylindrical or conical cock plug bodies, spool-type slider valves with a plate construction or spool-type slider valves with cylindrical valve stems or valve bodies.

Spool valves or slider valves provide a disadvantageous flow guidance of the melt and furthermore have relatively long melt flow paths in comparison to the cock-type valve embodiments. Such long flow paths cause problems in cleaning, waste of material, and difficulty in controlling the characteristics of the melt material during its rather long passage through the valve.

While the conventional cock-type valves at least partially avoid the above mentioned problems of slide-type valves, they suffer other disadvantages as follows. Previously known cock-type valves with a rotational drive in an axial direction of the cock plug body conventionally have a radially directed melt inlet as well as a radially directed melt outlet. When such valves are installed in connection with typical vertically-oriented melt filter arrangements, it is disadvantageously necessary to provide respective separate valve drives from above the filter and from below the filter. With such an arrangement, it is not possible to achieve a synchronization of both valves by using a rigidly interconnected shaft, for example, especially due to the relatively high rotational moments and the opposite rotation directions that are involved in the two valves. Moreover, the space is rather limited, especially underneath the filter arrangement, and for this reason, problems arise in the installation, operation and maintenance of the respective plant utilizing such conventional embodiments of melt flow control valves having axial rotational drives.

In double cock-type valves, both the melt inlet as well as the melt outlet are provided and controlled by a single cock, whereby operating advantages are achieved, but the melt feed channels and melt lines need to be substantially longer and therefore the additional cleaning effort and complication is considerably increased.

SUMMARY OF THE INVENTION

In view of the above, it is an object of the present invention to provide a melt flow control valve embodied in such a manner that the flow paths through the valve are kept rather short to provide improved cleaning possibilities, and that the drive for the rotatable cock plug body is arranged in such a manner to allow convenient installation and operation and to locate the drive arrangement substantially outside of the range of thermal radiation coming from a melt filter or the like. The invention further aims to reduce or completely avoid or overcome the disadvantages of the prior art, and to achieve additional advantages, as apparent from the present specification.

The above objects have been achieved in a melt flow control valve adapted to selectively control the flow of a flowable molten thermoplastic polymer from a melt inlet port to a selected one of at least two melt outlet ports provided in a valve housing. The valve further includes a rotatable cock plug body that is arranged within the valve housing and that has at least one flow channel therethrough including an inflow portion and an outflow portion to respectively provide the selected connection between the melt inlet port and the selected melt outlet port. Especially according to the invention, the melt inlet port extends substantially axially relative to the valve housing and the cock plug body, i.e. parallel to the rotation axis of the cock plug body, and axially connects to the inflow portion of the flow channel of the cock plug body, while the radially inner ends of the melt outlet ports extend substantially radially relative to the cock plug body and respectively communicate with the outflow portion of the flow channel of the cock plug body. Further according to the invention, pre-flooding passages extend from the flow channel in such a position so as to simultaneously connect both the first and second melt outlet ports of the valve housing with the flow channel when the rotatable cock plug body is in a prescribed rotation position.

An essential feature of the inventive melt valve arrangement is that it uses a single rotatable cock plug body arranged in a valve housing having a melt inlet port that is oriented axially relative to the cock plug body, and melt outlet ports that extend generally radially relative to the cock plug body. The inventive valve arrangement further includes a special packing and an additional tapering seal lip at the inlet port to achieve an effective sealing of the relatively large cross-section of the melt flow channel. Furthermore, this seal lip is so configured and arranged that it achieves an ever increasing surface pressure on the cooperating seal edge of the cock plug body as the melt pressure increases. The additional axial pressure or thrust of the melt acting on the cock plug body (which results from the axial arrangement of the inlet port) is taken up by a generally conventional axial bearing, which is permanently lubricated with a one-time high temperature resistant grease filling or packing, which is fully adequate in view of the relatively small rotational movement to which it is subjected.

In view of the narrow gap between the cock plug body and the valve housing, the sliding or gliding surfaces of the respective components are provided with a special surface treatment. Particularly in this context, the cock plug body is coated with a hard-facing or hard-casing material in the micron range, and the housing is nitrided. In this manner, the possibility of counterabrading and seizing of the cock plug body in the housing is reliably prevented. As an additional measure to prevent counterabrading and seizing of the cock plug body in the housing, the invention further provides that the cock plug body is rotated through a few minutes of rotational angle by a drive motor, either continuously or at specified time intervals. This procedure is carried out because the danger of counter-abrading and seizing is especially high after a long operating time of the system without an exchange or replacement of the filters, i.e. without a switching of the valve state.

Especially when the valve is used in connection with a melt filter arrangement, it is necessary that the valve switching process be carried out in such a manner that a small rotation of the cock plug body will leave open or maintain the previous prevailing flow direction and also already slightly open the new flow direction into the cleaned filter chamber. In this manner, the inventive valve ensures that the new filter and particularly the entire new filter chamber can be flooded with molten plastic material prior to the complete switch-over to the new filter chamber, so that the production process can continue without interruption. This is achieved by providing appropriately dimensioned melt flow channels that are arranged in such a configuration that a partial overlapping of both melt outlet channels is possible. The complete switch-over of the valve is then carried out to re-direct the melt flow from the used filter to the cleaned or replaced filter, after the new melt filter and its respective filter chamber has been completely filled with molten polymer and completely ventilated.

Advantages achieved by the present inventive valve arrangement include short melt flow paths as well as an optimal lateral arrangement of the valve drive. In other words, the drive does not need to be directly axially positioned relative to the valve housing and the cock plug body, but rather may be shifted laterally away from the axial position. In this manner it is ensured that the drive mechanism is easily accessible for operation and maintenance, for both the upper and the lower valve of a two valve arrangement in combination with a melt filter arrangement as described herein. Moreover, in this manner the valve drive mechanism is arranged in an area in which the relatively high processing temperatures of the polymeric melt have essentially no influence.

A further advantage of the inventive melt valve is that the laterally arranged valve drive mechanism can be driven by any known electrical, hydraulic or pneumatic drive motor or other prime mover, as well as a manual crank drive using a conventional gearing or other transmission for amplifying the rotational moment. Furthermore, the lateral arrangement of the valve drive mechanism makes it possible to achieve different switching intervals and rotation directions of the two valves, or to achieve a synchronous operation of the drives of both valves together. Another advantageous feature of the melt valve according to the invention is that both melt outlet channels can be closed simultaneously while a flushing bore or passage is selectively opened to flush out the valve and is then closed.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
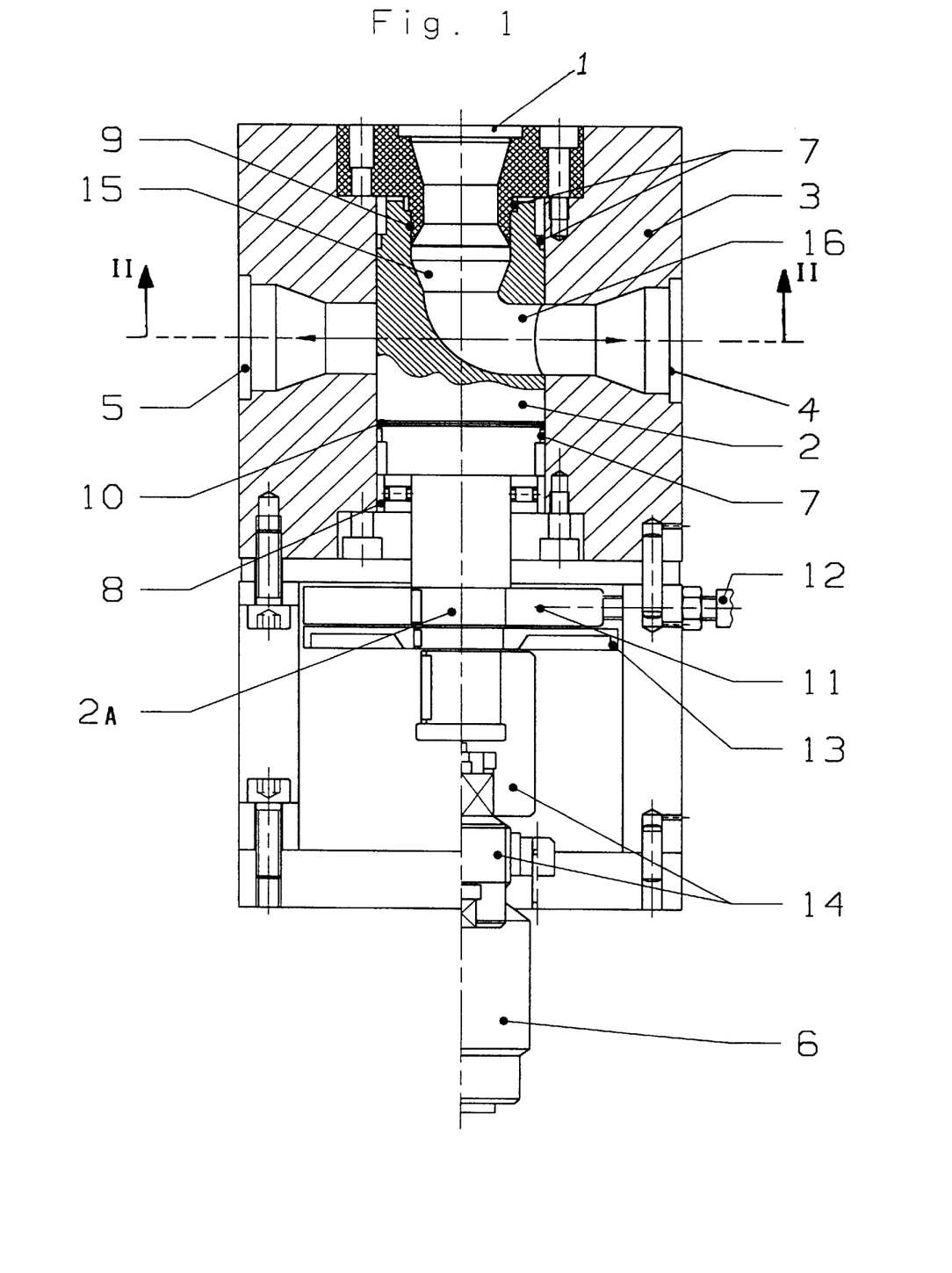
FIG. 1 is a schematic sectional view of a preferred embodiment of a melt valve according to the invention.

FIG. 1 schematically shows an axial section through a melt valve according to a preferred embodiment of the invention. The valve includes a valve housing 3 with a rotatable cock plug body 2 arranged therein. A polymer melt is supplied to the melt inlet port 1 of the housing 3, and from there proceeds in an axial direction into the inflow portion 15 of a flow channel provided in the cock plug body 2. The molten material or polymeric melt then further flows through the outflow portion 16 of the flow channel of the cock plug body 2. Depending on the rotational position of the cock plug body 2 in the housing 3, the melt will be supplied from the outflow portion 16 of the flow channel to either a first melt outlet port 4 or a second melt outlet port of the housing 3.

In this context, the cock plug body 2 is rotated into the desired rotational position by a drive arrangement 6 that is connected through a drive transmission means 14 and a shaft 2A to the cock plug body 2. The drive 6 may comprise any known electric motor, pneumatic motor, hydraulic motor, or other prime mover or actuator providing a rotational drive output or a linear drive output that can be converted through a linkage to a rotational or pivoting drive output. The drive transmission means 14 comprise any known reduction gearing or simply a drive shaft or any other power coupling to transmit the drive power from the drive arrangement to the cock plug body 2 through the intervening shaft 2A.

The cock plug body 2 is rotatably supported by a thrust bearing 8 which withstands the flow pressure of the melt being fed to the melt inlet port 1. A special seal 7 is arranged in the melt inlet port 1 so as to seal against and lead into the inflow portion 15 of the flow channel in the cock plug body 2. Specifically, the specialized seal 7 includes a seal body that is arranged in the inlet port 1 and has a conically tapering inlet area transitioning into a conically expanding outlet area therein. The expanding outlet area is provided within a protruding seal flange lip 9 that protrudes from the seal body into the inflow portion 15 of the flow channel in the cock plug body and seals against the inner wall of the inflow portion 15.

Thus, the seal 7 and especially the seal flange lip 9, thereby prevents the flow of the pressurized melt to leak out of the valve arrangement or past the cock plug body 2 into the area of the thrust bearing 8. The seal 7 is fixed in the housing 3 at the melt inlet port 1, and seals against the rotatable cock plug body 2. The seal lip 9 reinforces the seal effect between the fixed seal 7 and the rotatable cock plug body 2. Namely, since the seal lip 9 reaches into and seals against the inner wall of the inflow portion 15 of the flow channel, the seal effect between the seal lip 9 and the cock plug body 2 will increase as the feed pressure of the melt increases. The higher the pressure, the tighter the seal.

The gap between the cock plug body 2 and the housing 3 is selected to be as small as possible for the design pressure conditions, so that the cock plug body 2 may just still be rotated, but an escape of the melt through the gap is prevented. As a further safety precaution, leakage grooves 10 are provided encircling the cock plug body 2 before and after the melt outlet ports 4 and 5. These leakage grooves serve to collect any minimal amount of polymeric melt that does manage to leak past the seal 7 and through the gap, so that this leakage melt can then be conveyed through leakage passages 19 out of the housing 3 in a pressure-free manner.

The thrust bearing 8 supports the axial forces exerted on the cock plug body 2 by the feed pressure of the melt. The bearing 8 may be permanently filled with a temperature resistant grease or other lubricant, which adequately and reliably guarantees an effective permanent lubrication of the bearing 8 in connection with the rather small rotational movements and slow rotational speeds that arise in the present application. A stop cam disk 11 in the form of a notched cam plate or the like is rigidly connected to the shaft 2A which in turn is connected to the cock plug body 2. By appropriate selection of the perimeter outline shape of the stop cam disk 11, and proper corresponding adjustment of an adjusting screw 12, the rotational movement and especially the rotational end positions of the cock plug body 2 may be adjusted or limited. A rotational angle indicator 13 is also rigidly connected to the shaft 2A. This angle indicator 13 may include a visual or mechanical angle scale from which the rotational position of the cock plug body 2 at any time can be determined by visually reading the indication on the scale. Alternatively, the angle indicator 13 may include an electrically, magnetically, optically, or mechanically readable angular position information so that the respective position of the cock plug body 2 can be indicated, monitored, and/or recorded at a location external and remote from the valve arrangement itself.

Figure 2:
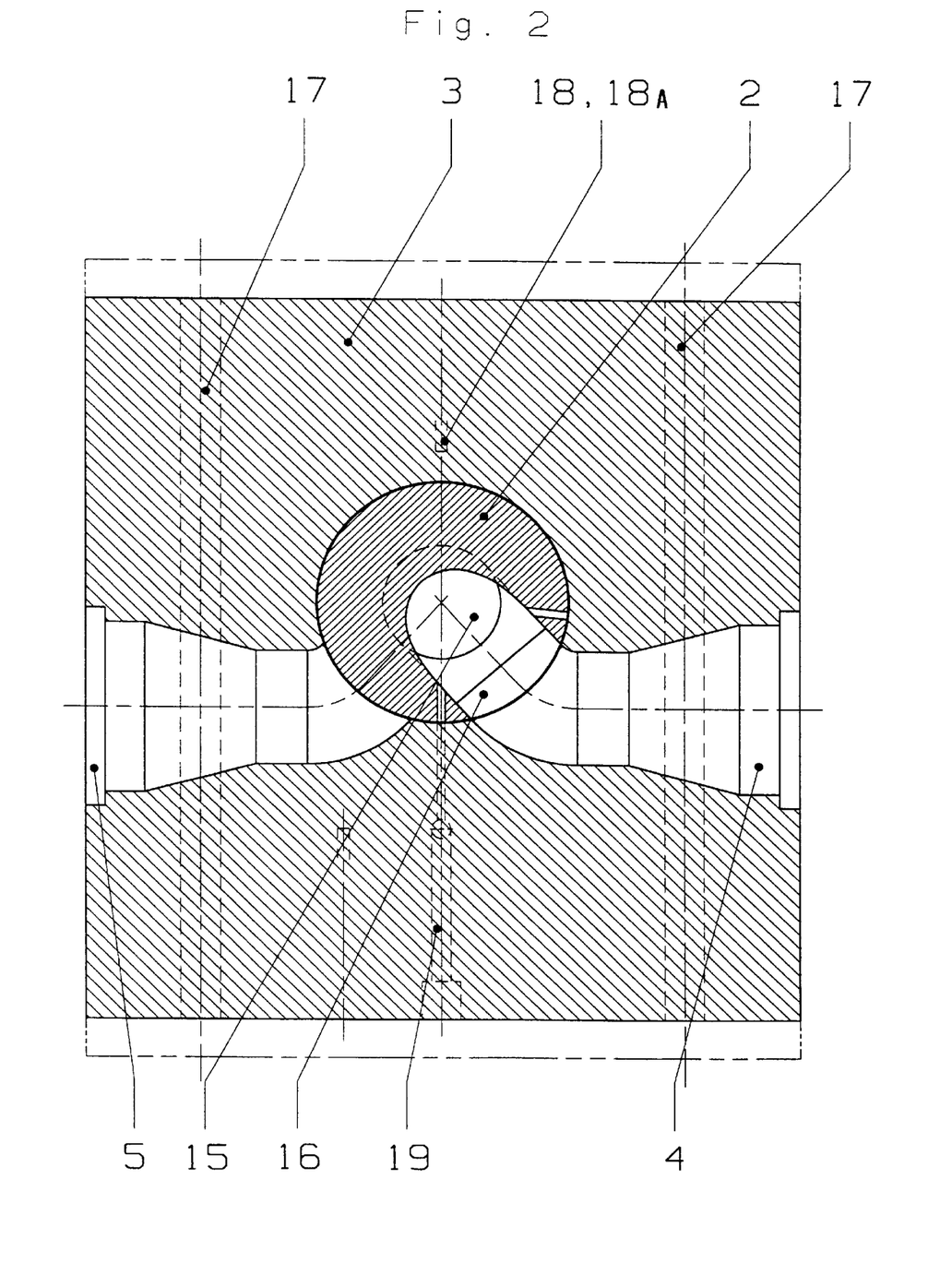
FIG. 2 is a schematic cross-section taken along the line II—II in FIG. 1.

FIG. 2 shows a cross-section through the valve of FIG. 1 along the section line II—II, which passes through the housing 3 and the cock plug body 2. In the illustrated rotational position of the cock plug body 2, the melt flows into the inflow portion 15 and then out through the outflow portion 16 of the cock plug body 2 to the melt outlet port 4. It is also apparent that a rotation of the cock plug body 2 clockwise by about 90° will bring the outflow portion 16 of the cock plug body 2 into communication with the second melt outlet port 5 so as to direct the melt out of that port. The two outlet ports 4 and 5 are not exactly opposite one another in the housing 3, i.e. they are not rotationally displaced by 180° from each other. Instead, the two outlet ports 4 and 5 are radially displaced less than 180° from each other, and have a curving configuration so that a rotational angle of only about 90° of the cock plug body 2 is sufficient for completely switching from one outlet port to the other. In this manner, the necessary rotational angle for switching-over the valve is reduced, and also it is achieved that a small rotation of the cock plug body 2 will provide a partial overlapping of the outflow portion 16 with both outlet ports 4 and 5 to allow flow from the inflow portion 15 to both of the outlet ports. Nonetheless, the outlet ends of the outlet ports 4 and 5 are positioned on opposite sides of the valve housing 3, substantially 180° opposite each other, with respect to each other (but not with respect to the rotation axis). This allows the valve housing to conveniently have a quadrangle block shape and allows easy connection of melt flow pipes to the outlet ports.

The overall valve and particularly the valve housing 3 may be heated as necessary to maintain the proper flow characteristics of the polymeric melt flowing therethrough. For this purpose, heating elements 17, which may be any known type of heating elements, are integrated or inserted into corresponding holes provided in the housing 3. The temperature of the valve arrangement is detected by temperature sensors 18 such as thermocouples, thermistors, or the like, which are inserted into bored holes 18A in the housing 3. The temperature sensors 18 are connected to temperature regulation circuitry which appropriately controls or regulates the operation of the heating elements 17 to maintain the proper temperature.

Also illustrated by a dashed line in FIG. 2 is a leakage bore or passage 19 which allows any leakage flow of melt to be drained away vertically downwards out of the horizontal plane, for example after being collected by one of the leakage grooves 10 as described above. The leakage passage 19 is provided at a radial plane that is axially displaced from the section plane, so that it is merely indicated by a dashed line as lying further into the body of the housing 3 relative to the illustrated section plane. Thus, it should be understood that the leakage passage 19 is not in communication with the pre-flooding passage 20.

Figure 3:
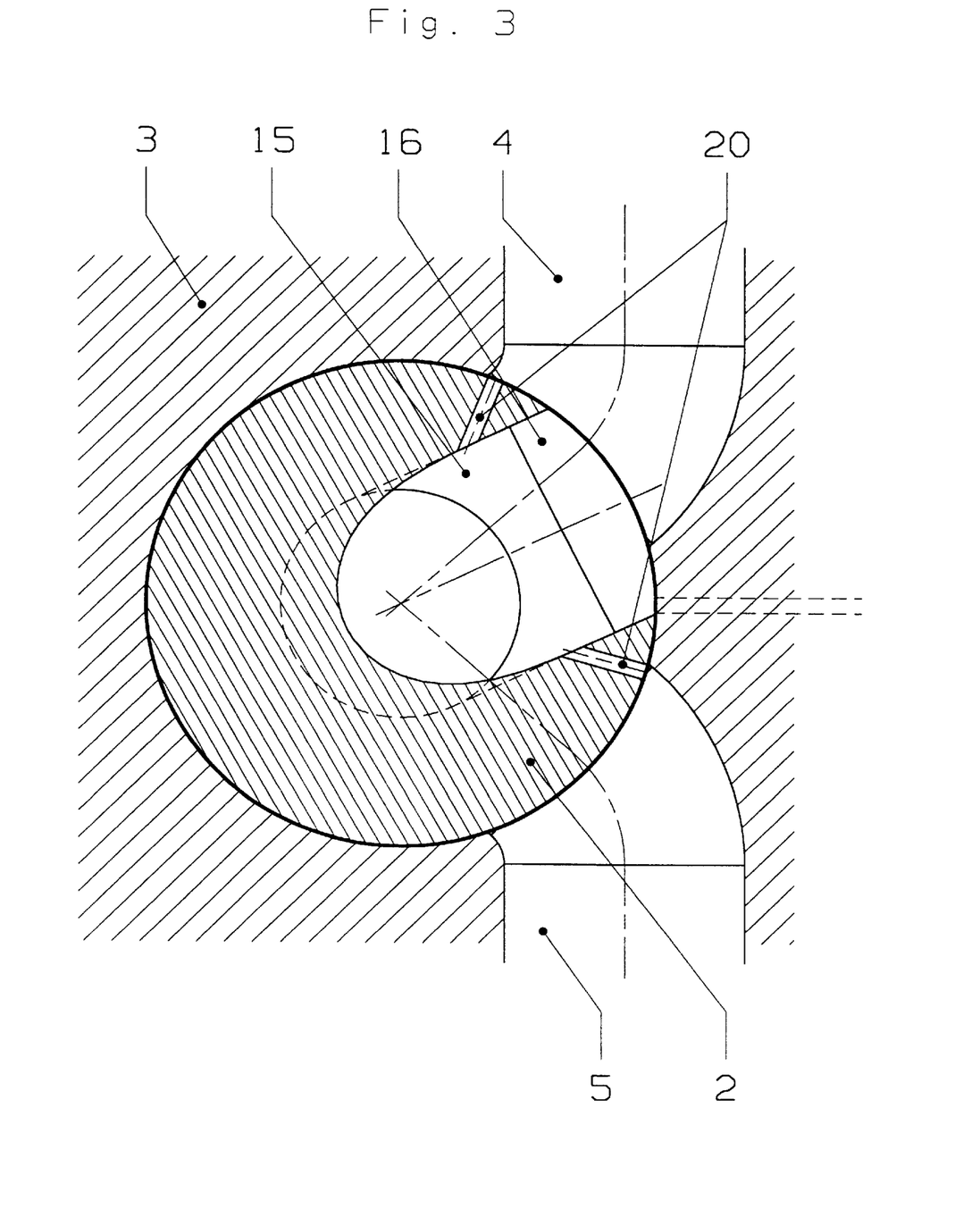
FIG. 3 is an enlarged schematic cross-sectional view of a portion of FIG. 2, illustrating a rotational position of the cock plug body for carrying out a pre-flooding operation.

FIG. 3 illustrates a cross-section through the housing 3 and the cock plug body 2 in a state in which the cock plug body 2 has been rotated slightly from the outlet port 4 toward the outlet port 5, into an intermediate pre-flooding position in which a pre-flooding bore or passage 20 allows a defined quantity or rate of flow of melt into the second melt outlet port 5 while the main outflow portion 16 of the cock plug body 2 is still communicating the main melt flow to the first melt outlet port 4. In this manner, the pre-flooding passage 20 begins a pre-flooding process of prefilling melt into the other filter chamber that is to be used next. A second pre-flooding passage 20 to the other side of the outflow portion 16 operates in a similar manner when the cock plug body is being switched from the outlet port 5 to the outlet port 4.

As a second advantageous effect, the pre-flooding passages 20 prevent the formation of stagnant or "dead" areas in the main outflow portion 16 and the adjoining portion of the outlet ports 4 and 5, because any such area is flushed with a flow of melt through the pre-flooding passage 20. Namely, in the position as shown in FIG. 3, when the cock plug body 2 has begun to be rotated from the first outlet port 4 to the second outlet port 5, the area of the outflow portion 16 that has already turned away from the melt outlet port 4 and is thereby partially covered by a wall of the valve housing 3 between the two ports 4 and 5, and the area in the outlet port 4 that is already behind the wall of the cock plug body 2 where the outflow portion 16 has turned away, would otherwise be "dead" or stagnant corner areas which would give rise to the danger of solidification or excessive thickening of the molten material. The pre-flooding passages 20 avoid this, by ensuring that the melt continues to flow also through these partially covered or blocked corner areas.

Figure 4:
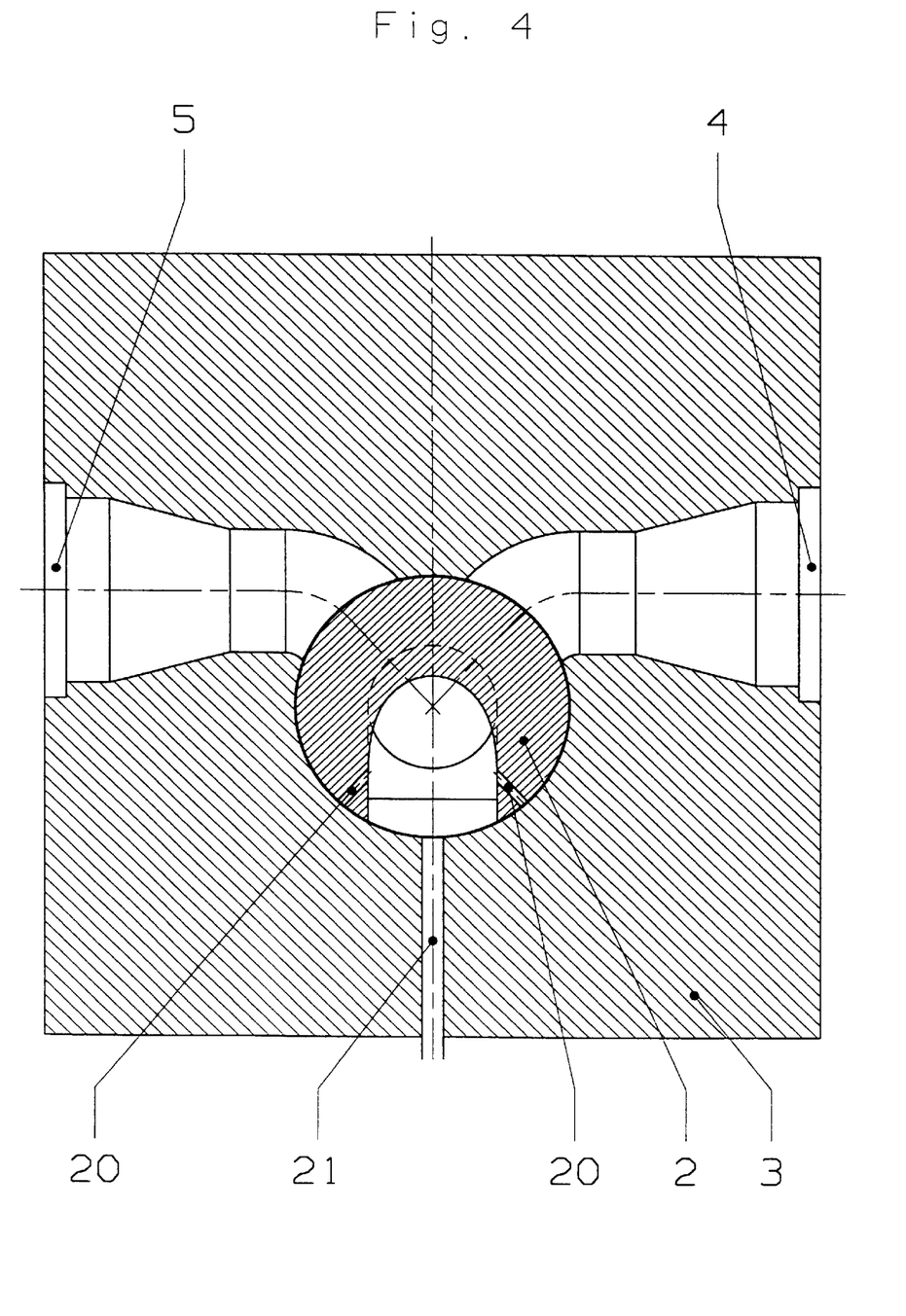
FIG. 4 is a sectional view of the melt valve with the cock plug body rotated into a position in which the ventilating and/or flushing passage is open.

FIG. 4 schematically shows a cross-section through a valve according to the invention, in which the cock plug body 2 is rotated into a position so that a venting and/or flushing bore or passage 21 is opened in communication with the outflow portion 16 of the flow channel of the cock plug body 2, while both outlet ports 4 and 5 are closed. In this position, the flow passage of the cock plug body 2 can be drained and/or flushed out through the inflow portion 15, the outflow portion 16, and the flushing passage 21, in either direction, without influencing the outlet ports 4 and 5.

Figure 5:
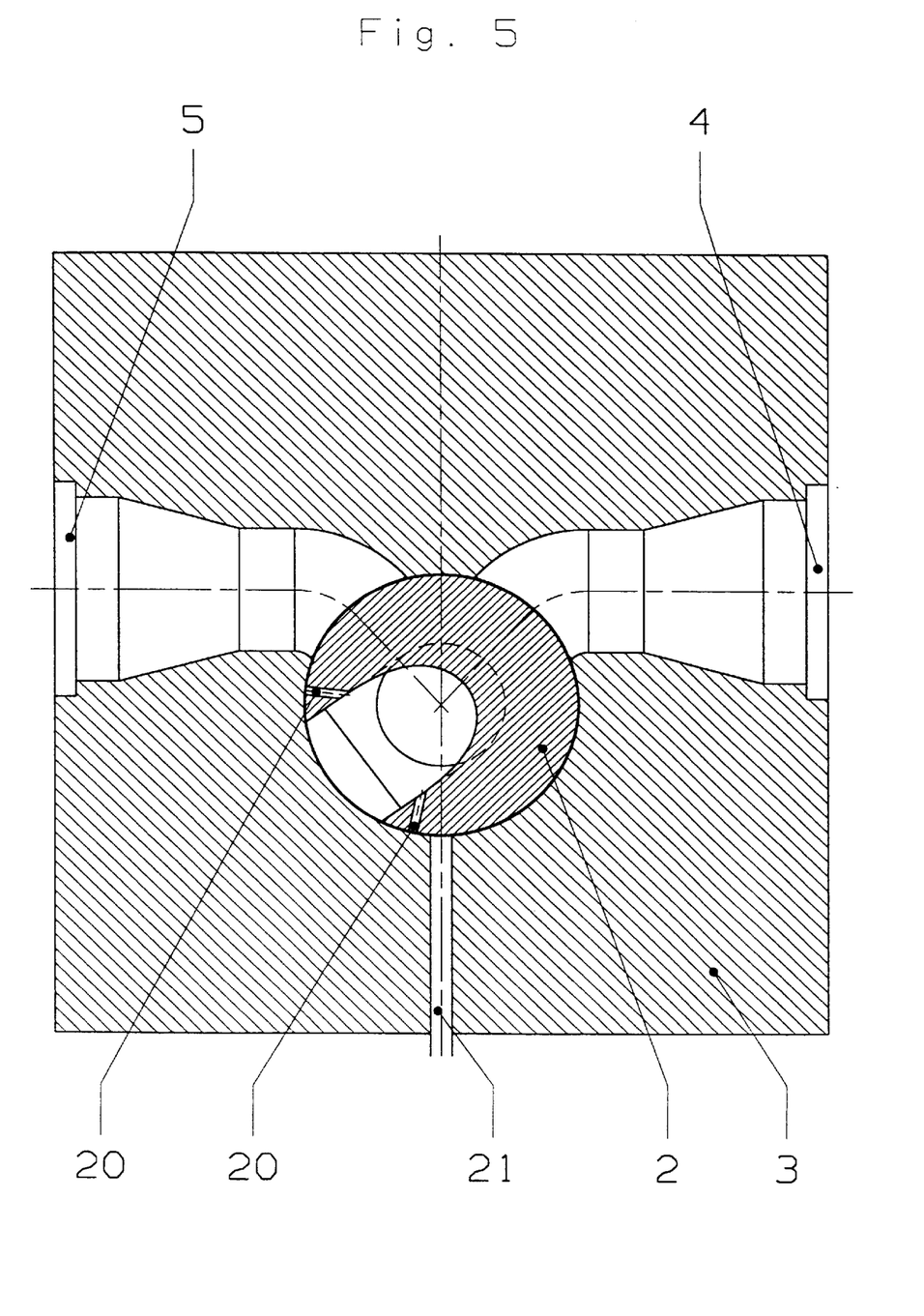
FIG. 5 is a sectional view similar to that of FIG. 4, but showing the melt valve with the cock plug body rotated into a position in which all channels or passages are closed.

FIG. 5 shows the same valve arrangement as FIG. 4, but with the cock plug body 2 rotated to a position in which both outlet ports 4 and 5 as well as the flushing or venting passage 21 are closed. Also in this position, since the outflow portion 16 of the cock plug body 2 is covered, the flow into the inlet port 1 is also shut off.

Figure 6:
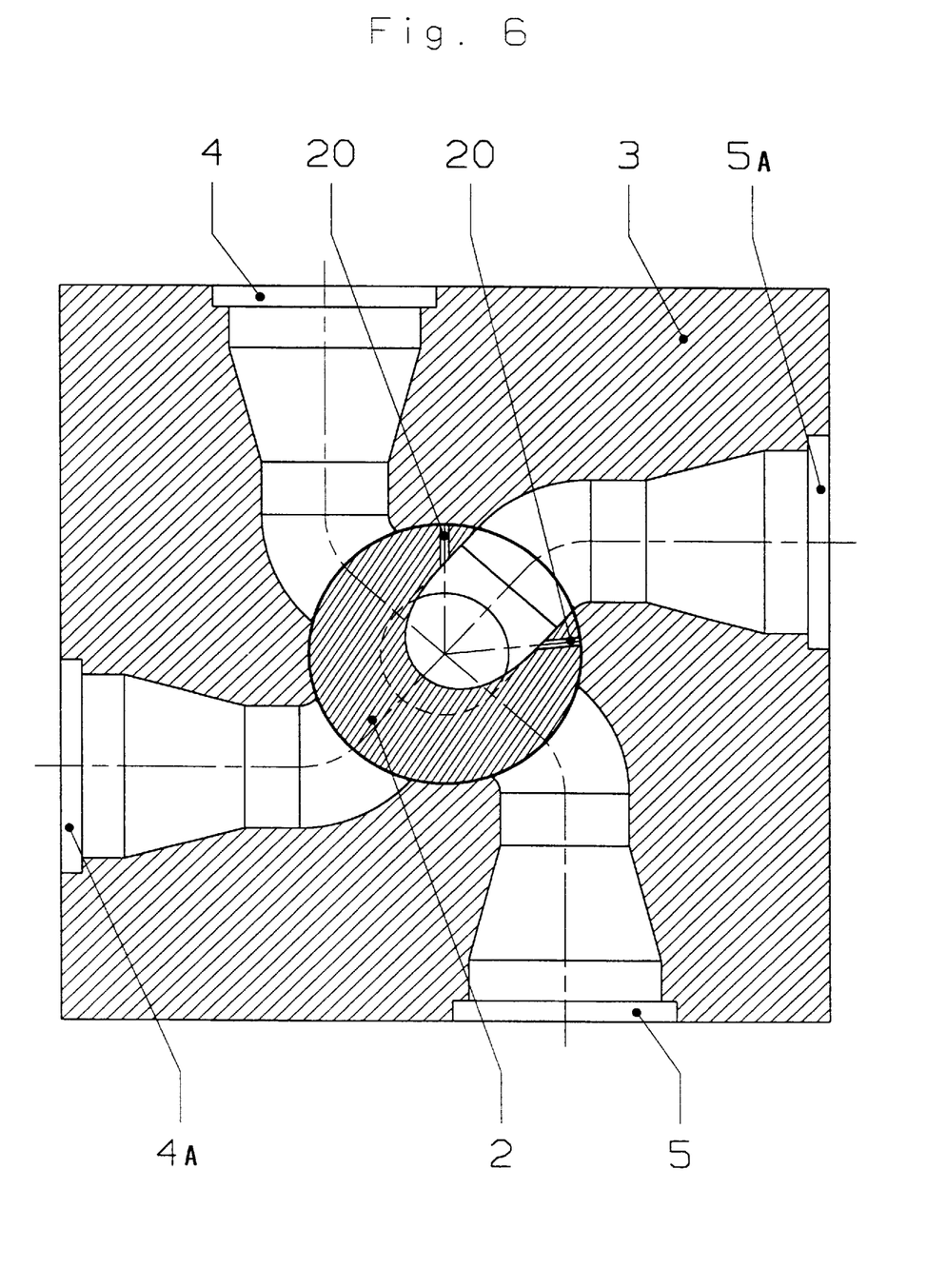
FIG. 6 is a cross-sectional view of another embodiment of a valve according to the invention having a total of four outlet ports.

FIG. 6 schematically shows a cross-section through another embodiment of a valve according to the invention having a total of four outlet ports 4, 4A, 5 and 5A, whereby the outlet ports generally extend in a pinwheel pattern at respective 90° rotational offsets from each other, so that both the external port openings as well as the internal openings communicating with the cock plug body 2 are rotationally offset by 90° from each other. The cock plug body includes a single outflow portion 16, and can be rotated into desired positions to selectively direct the flow of melt from the inlet port 1 to any selected one of the outlet ports 4, 4A, 5 and 5A. Moreover, pre-flooding passages 20 are provided to provide a pre-flooding operation into any next successive one of the outlet ports in the same manner as described above in the context of two outlet ports.

Figure 7:
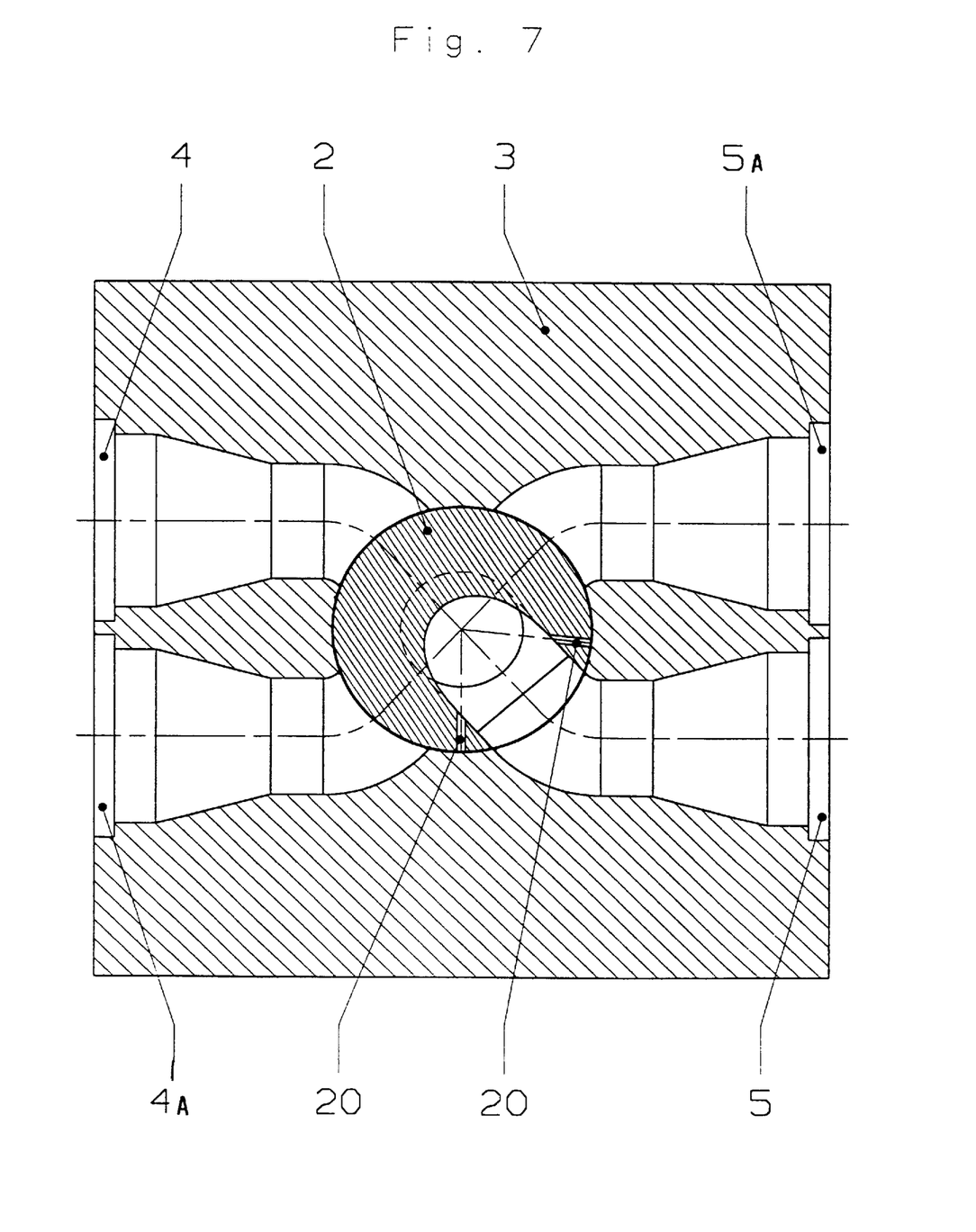
FIG. 7 is a cross-sectional view of yet another embodiment of a valve according to the invention having four outlet ports in a different arrangement as compared to FIG. 6.

FIG. 7 shows a valve according to the invention having a further arrangement of four outlet ports 4, 4A, 5 and 5A, whereby two ports 4 and 4A extend parallel to each other to open on one side of the valve housing 3, while the other two ports 5 and 5A extend in parallel to each other to open on the opposite side of the valve housing 3. In other words, one pair of ports 4 and 4A is oriented 180° opposite the other pair of ports 5 and 5A. None-theless, the internal end or opening of each one of the ports 4, 4A, 5 and 5A cooperating with the cock plug body 2 is displaced by a rotational angle of 90° relative to the adjacent openings of the adjacent ports. Thus, the operation of the cock plug body 2 so as to bring the outflow portion 16 and/or the pre-flooding passages 20 into communication with any selected one or two adjacent ones of the outlet ports 4, 4A, 5 and 5A corresponds to the operations as described above.

Figure 8:
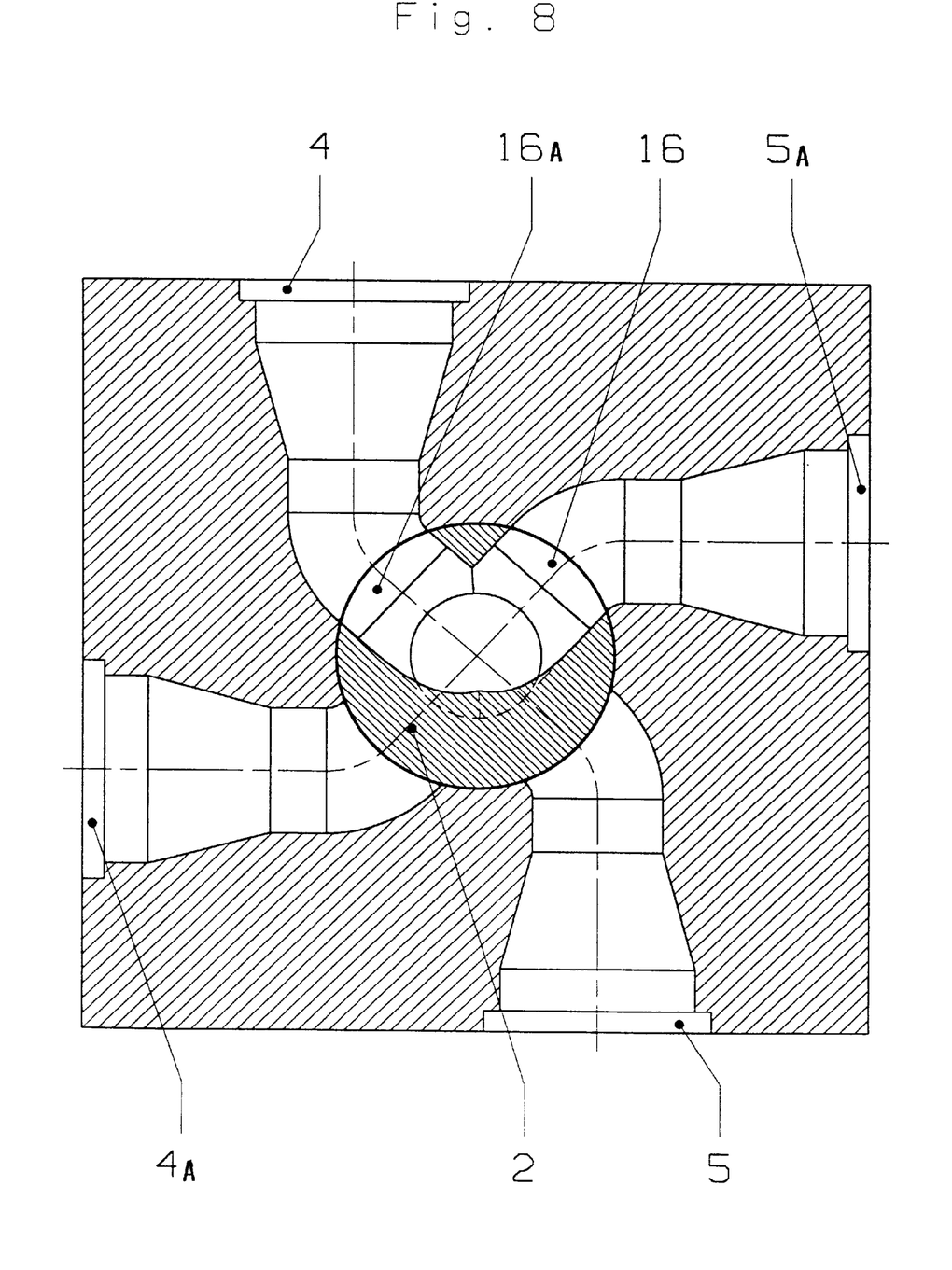
FIG. 8 is a cross-sectional view of a further embodiment of the valve according to the invention having four outlet ports in the housing and having a double outlet from the flow passage in the cock plug body.

FIG. 8 schematically shows a cross-section through an embodiment of a valve according to the invention in which the valve housing 3 substantially corresponds to that shown in FIG. 6 and described above. Namely, the housing 3 includes four outlet ports 4, 4A, 5 and 5A positioned 90° offset from one another in a pinwheel pattern. However, in the present embodiment, the cock plug body 2 has a double outflow channel or two outflow portions 16 and 16A that each communicate with and branch off from the single inflow portion 15. With this arrangement, the cock plug body 2 will simultaneously connect the melt flow through the two outflow portions 16 and 16A respectively to any two selected neighboring ones of the outlet ports 4, 4A, 5 and 5A.

While not shown in the drawings, the above described embodiments of the present melt flow control valve arrangement are especially suitable for use in connection with a melt filter arrangement in a thermoplastic polymer melt sheet extrusion plant. The respective outlet ports are connected to respective filter chambers of the filter arrangement, so that the present valve selectively directs the flow of polymeric melt to one or more respective operating chambers, while blocking the flow of melt to the one or more non-operating chambers so that the filters in those chambers can be replaced or cleaned before being put back into service by again switching the state of the valve. Another valve having the same basic construction as described herein but omitting the pre-flooding passages can be connected in "reverse" to the outlet side of the filter chambers, to selectively open and close the outlet of one or the other filter chamber. In this context, the second valve connected in "reverse" has a single axial outlet port (corresponding to the single inlet port of the above described embodiments of the invention) and at least two radial inlet ports (corresponding to the outlet ports of the above described embodiments of the invention). The operation of this valve corresponds to that of the valves described above, but merely with a reverse flow direction therethrough.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The term "substantially" as used herein refers to a usual and customary range of manufacturing, installation and operation tolerances in this field without deviating from the effects and functions to be achieved.

What is claimed is:

1. A flow control valve comprising:
   a valve housing having an inlet port and at least first and second outlet ports therein; and
   a cock plug body that is rotatably arranged in said valve housing so as to be rotatable about a rotation axis, and that has a flow passage including an inflow portion and a first outflow portion therein, and that has first and second pre-flooding passages extending from said flow passage to positions rotationally displaced to opposite sides of said outflow portion of said flow passage;
   wherein:
      said inflow portion of said flow passage and said inlet port are arranged in communication with each other, and each respectively extend in a direction that is at least substantially parallel to said rotation axis;
      said outflow portion of said flow passage and at least a respective radially inner end of each said outlet port respectively each extend substantially radially relative to said rotation axis;
      said outflow portion of said flow passage and said outlet ports are so arranged relative to each other so that said outflow portion of said flow passage communicates with said first outlet port and not said second outlet port when said cock plug body is in a first rotational position about said rotation axis, and so that said outflow portion of said flow passage communicates with said second outlet port and not said first outlet port when said cock plug body is in a second rotational position rotationally displaced from said first rotational position about said rotation axis; and
      said pre-flooding passages are so arranged relative to said outlet ports and said outflow portion of said flow passage so that said first pre-flooding passage communicates with said second outlet port and said outflow portion communicates with said first outlet port when said cock plug body is in a first intermediate rotational position between said first and second rotational positions, and so that said second pre-flooding passage communicates with said first outlet port and said outflow portion communicates with said second outlet port when said cock plug body is in a second intermediate rotational position between said first intermediate rotational position and said second rotational position.

2. The flow control valve according to claim 1, further comprising a temperature detector and a heating element arranged in thermal communication with said valve housing.

3. The flow control valve according to claim 1, wherein said second pre-flooding passage communicates with said first outlet port when said cock plug body is in said first intermediate rotational position, and said first pre-flooding passage communicates with said second outlet port when said cock plug body is in said second intermediate rotational position.

4. The flow control valve according to claim 1, wherein said valve housing further has third and fourth outlet ports therein, and wherein said outflow portion of said flow passage of said cock plug body can be selectively brought into communication with said third and fourth outlet ports respectively by rotating said cock plug body into third and fourth rotational positions that are rotationally displaced from each other and from said first and second rotational positions.

5. The flow control valve according to claim 4, wherein said first, second, third and fourth outlet ports are respectively rotationally offset by 90° from one another.

6. The flow control valve according to claim 4, wherein said outlet ports are arranged as a first adjacent pair of said outlet ports and a second adjacent pair of said outlet ports, wherein at least respective radially outer ends of said outlet ports of each said pair of outlet ports extend substantially parallel to each other, and wherein said first and second pairs are rotationally offset by 180° relative to one another.

7. The flow control valve according to claim 6, wherein said respective inner ends of said outlet ports extend substantially radially relative to said rotation axis and are rotationally offset by 90° relative to one another.

8. The flow control valve according to claim 1, wherein said flow passage of said cock plug body further includes a second outflow portion connected to said inflow portion so that said first and second outflow portions are respective branches of said flow passage, and wherein said first and second outflow portions are so arranged that said outflow portions can respectively simultaneously communicate with two of said outlet ports.

9. The flow control valve according to claim 1, further comprising a rotational drive, a shaft arranged on said rotation axis and a drive transmission arrangement connected to said shaft, wherein said shaft and said transmission arrangement are interconnected between said rotational drive and said cock plug body so that said drive can rotate said cock plug body about said rotation axis.

10. The flow control valve according to claim 9, wherein said rotational drive comprises an electric motor.

11. The flow control valve according to claim 9, further comprising a stop cam disk rigidly connected to said shaft.

12. The flow control valve according to claim 11, further comprising an adjusting screw that adjustably contacts and limits a rotational motion of said stop cam disk.

13. The flow control valve according to claim 9, wherein said shaft is connected to said cock plug body at a first end thereof directly opposite a second end thereof in which said inflow portion of said flow passage is provided, and further comprising a thrust bearing supporting said first end of said cock plug body.

14. The flow control valve according to claim 9, wherein said drive is arranged laterally next to said valve housing.

15. An arrangement of two valves that are each according to claim 9, wherein said drives of said valves are respectively interconnected to provide a synchronized drive of both of said valves.

16. The flow control valve according to claim 1, further comprising an electronic element selected from the group consisting of an electronic position transducer and an electronic switching element arranged to cooperate with said cock plug body so as to detect a respective existing rotation position of said cock plug body.

17. The flow control valve according to claim 16, further comprising a drive shaft connected coaxially to said cock plug body, and wherein said electronic element is said electronic position transducer which comprises a rotational angle transducer rigidly connected to said drive shaft.

18. The flow control valve according to claim 1, wherein an outer surface of said cock plug body includes a hard-casing layer in a micron range, and an inner surface of said housing that faces said outer surface of said cock plug body includes a nitrided layer.

19. The flow control valve according to claim 1, further comprising a seal member including a seal body arranged in said inlet port of said housing and a seal flange lip protruding from said seal body into said inflow portion of said cock plug body and sealing against an inner wall surface of said inflow portion.

20. The flow control valve according to claim 1, further having a leakage groove encircling an outer surface of said cock plug body and a leakage passage extending through said valve housing from said leakage groove to an exterior of said valve.

21. The flow control valve according to claim 1, further having at least one auxiliary passage extending through said housing to communicate with said outflow portion of said flow passage when said cock plug body is rotated to a flushing position in which none of said outlet ports is in communication with said flow passage, and wherein said auxiliary passage is adapted to vent or flush said flow passage.

22. An arrangement for continuously filtering a fluid, comprising:
a first filter having a first filter inlet and a first filter outlet;
a second filter having a second filter inlet and a second filter outlet;
a first flow control valve according to claim 1; and
a second valve comprising a valve housing having an outlet port and at least first and second inlet ports therein, and a cock plug body rotatably arranged in said valve housing so as to be rotatable about a rotation axis, and having a flow passage including an outflow portion and an inflow portion therein, wherein said outflow portion of said flow passage and said outlet port are arranged in communication with each other and each respectively extend in a direction that is at least substantially parallel to said rotation axis, said inflow portion of said flow passage and at least a respective radially inner end of each said inlet port respectively each extend substantially radially relative to said rotation axis, said inflow portion of said flow passage and said inlet ports are so arranged relative to each other so that said inflow portion of said flow passage communicates with said first inlet port and not said second inlet port when said cock plug body is in a first rotational position about said rotation axis and so that said inflow portion of said flow passage communicates with said second inlet port and not said first inlet port when said cock plug body is in a second rotational position rotationally displaced from said first rotational position about said rotation axis, and said second valve excludes pre-flooding passages;

wherein:
said first filter inlet and said second filter inlet are respectively connected to said first and second outlet ports of said first valve; and
said first filter outlet and said second filter outlet are respectively connected to said first and second inlet ports of said second valve.

23. The arrangement according to claim 22, wherein each said valve further comprises a drive connected to said cock plug body thereof, and wherein said inlet ports and said outlet ports and said drives of said valves all lie in a horizontal plane.

24. A flow control valve comprising:
a valve housing having an inlet port and at least first and second outlet ports therein; and
a cock plug body rotatably arranged in said valve housing so as to be rotatable about a rotation axis, and having a flow passage including an inflow portion and a first outflow portion therein;

wherein:
said inflow portion of said flow passage and said inlet port are arranged in communication with each other, and each respectively extend in a direction that is at least substantially parallel to said rotation axis;
said outflow portion of said flow passage and at least a respective radially inner end of each said outlet port respectively each extend substantially radially relative to said rotation axis;
said outflow portion of said flow passage and said outlet ports are so arranged relative to each other so that said outflow portion of said flow passage communicates with said first outlet port and not said second outlet port when said cock plug body is in a first rotational position about said rotation axis, and so that said outflow portion of said flow passage communicates with said second outlet port and not said first outlet port when said cock plug body is in a second rotational position rotationally displaced from said first rotational position about said rotation axis;
said outlet ports extend along a radial plane; and
each one of said outlet ports respectively further includes a radially outer end that extends perpendicularly relative to a respective outer wall surface of said valve housing through which said outer end opens, and a bend between said radially inner and outer ends so that said radially outer end does not extend radially relative to said rotation axis.

* * * * *